Oct. 12, 1954   L. E. ALBURTIS   2,691,740
TRANSMISSION MOUNTED GENERATOR
Filed May 16, 1950

Lawrence E. Alburtis
INVENTOR.

Patented Oct. 12, 1954

2,691,740

UNITED STATES PATENT OFFICE 2,691,740

TRANSMISSION MOUNTED GENERATOR

Lawrence E. Alburtis, Warrensburg, Mo., assignor of thirty-three and one-third per cent to Carl E. Alburtis, and thirty-three and one-third per cent to Clarence L. Alburtis, both of Warrensburg, Mo.

Application May 16, 1950, Serial No. 162,301

1 Claim. (Cl. 310—83)

The present invention relates to improvements in generator operating arrangements, and more particularly to generators adapted to be mounted on the transmission housing of an automobile, truck or tractor.

An object of the present invention is to provide a transmission mounted generator which is adapted to be driven at selected speeds regardless of the speed of the automobile.

A further object of the present invention is to provide a generator mounting arrangement wherein the speed of the generator may be varied selectively.

A further object of the present invention is to provide a power take-off for a vehicle generator wherein a minimum of modification is necessitated for mounting.

This invention also has for its object to provide a transmission mounted generator that is positive in operation, convenient in use, easily mounted on a transmission housing and relatively simple.

The invention also comprises novel details of construction and novel combinations and arrangements of parts, which will more fully appear in the course of the following description. However, the drawings merely show and the following description merely describes embodiments of the present invention, which are given by way of illustration or example only.

The best form in which I have contemplated applying my invention is illustrated in the accompanying drawings, wherein.

Figure 1:
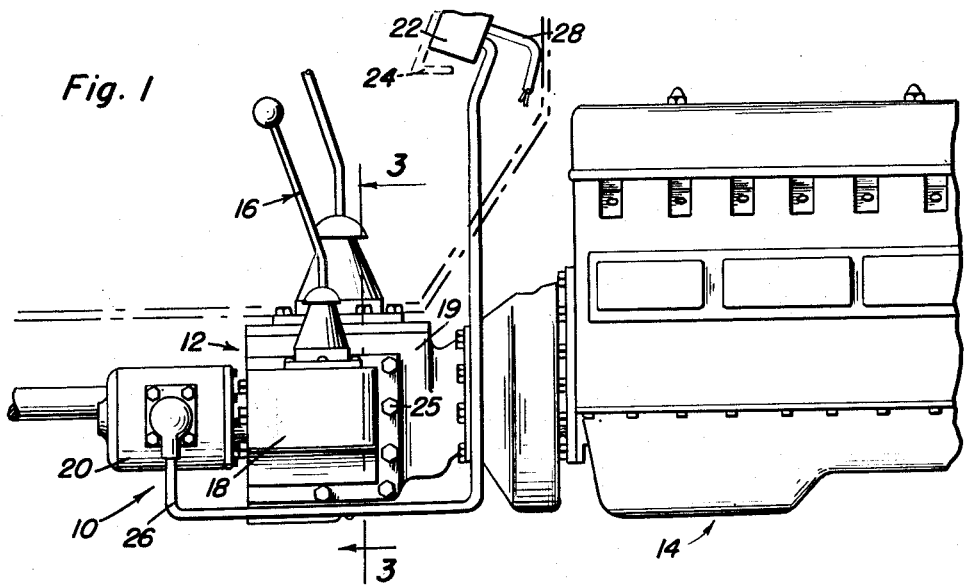
Figure 1 is an elevational plan view showing the generator and gear housing mounted on the transmission housing.
Figure 2:
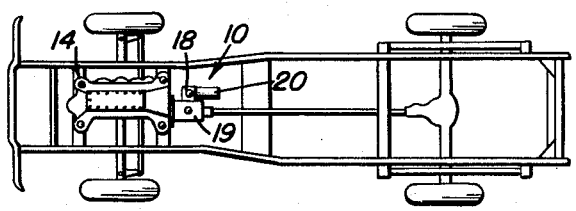
Figure 2 is a top plan view showing the generator positioned on the transmission housing.
Figure 3:
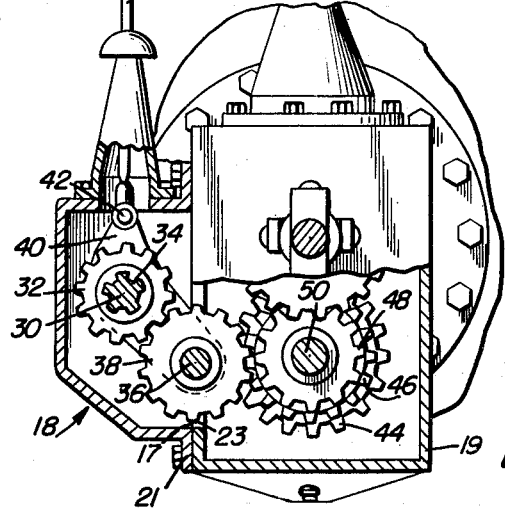
Figure 3 is a vertical transverse sectional view taken substantially along line 3—3 with parts thereof in section.

Referring now more particularly to the drawings, wherein like numerals designate like parts throughout, the numeral 10 designates generally the generator and gear housing mounted on the vehicle transmission 12 to the rear of the vehicle engine 14. The generator and gear housing 10 consist of a generator 20 and a gear housing 18 having an open side 17 and a flanged portion 21 which is affixed to the side of the transmission housing 19 which is similarly provided with an opening 23 for communication with the opening 17. The means for securing the gear housing 18 to the transmission housing 19 comprises a plurality of bolts 25. The generator 20 is provided with an electrical power take-off conduit 26 which leads to an ammeter fixed to the automobile or vehicle dashboard 24 with a conduit 28 leading therefrom to remote points where power is needed.

The generator 20 and the gear housing 18 are in axial alignment so that the generator shaft 30 may be provided with a spur gear 32, the axis of which will be parallel to the axes of the gears in the transmission housing. The spur gear 32 is suitably affixed to the shaft 30 by a spline 34 or any other desired means. A second spur gear 38 which is in mesh with the first spur gear 32 is mounted for rotation about lay shaft 36 which is mounted in the frame 40. The frame 40 consists of a pair of plates which are positioned on each side of the spur gears 32 and 38 so that longitudinal movement of the frame 40 will cause longitudinal displacement of the spur gear 32 on the spline 34.

The frame 40 is suitably mounted for longitudinal and pivotal movement on the shaft 42 which is secured in the gear housing 18. A conventional gear shift 16 is mounted on the upper side of the gear housing 18, and by movement of the shaft 41, pivotal and longitudinal movement of the frame 40 is procured.

In the conventional transmission housing 19, a plurality of gears 44, 46 and 48 are mounted on a longitudinal shaft 50. It will readily be seen that movement of the gear shift 16 will selectively cause the spur gear 38 to engage one of the plurality of gears 44, 46 and 48, whereby the spur gear 32 will be driven along with the generator shaft 30, driving the generator at the desired speed, delivering variable amounts of power.

Some changes may be made in the construction and arrangement of the parts of my device without departing from the real spirit and purpose of my invention, and it is my intention to cover by my claim any modified forms of structure or use of mechanical equivalents which may be reasonably included within their scope without sacrificing any of the advantages thereof.

Having described the invention, what is claimed as new is:

In combination with a motor vehicle transmission, a generator secured to the rear of a gear housing, said gear housing being secured to the side wall of the transmission housing with said gear housing having an open side communicating with an open side of said transmission housing, the armature shaft of said generator extending into said gear housing and having a splined portion on which is slidably mounted a first spur gear, a shaft mounted within said gear housing in vertical parallel relation to said armature shaft, a frame pivotally and slidably mounted on said shaft, said frame engaging the sides of said first spur gear, a second spur gear rotatable on a shaft carried by said frame, said second spur gear being in contsant engagement with said first spur gear, shift means for moving said frame to selectively engage said second spur gear with gear portions of a cluster gear carried by said transmission housing.

References Cited in the file of this patent

UNITED STATES PATENTS

| Number | Name | Date |
|---|---|---|
| 1,589,093 | Barrett | June 15, 1926 |
| 1,860,246 | Horste | May 24, 1932 |
| 1,872,924 | Galanot | Aug. 23, 1932 |
| 2,094,421 | Wagner | Sept. 28, 1937 |
| 2,294,597 | Gillespie et al. | Sept. 1, 1942 |
| 2,375,785 | Goode et al. | May 15, 1945 |
| 2,410,849 | Waseige | Nov. 12, 1946 |
| 2,476,275 | Bliss | July 19, 1949 |

FOREIGN PATENTS

| Number | Country | Date |
|---|---|---|
| 570,440 | Great Britain | July 6, 1945 |